US009009231B2

(12) United States Patent
Poikselka

(10) Patent No.: US 9,009,231 B2
(45) Date of Patent: Apr. 14, 2015

(54) GROUP COMMUNICATION IN A COMMUNICATION SYSTEM

(75) Inventor: Mikka Poikselka, Espoo (FI)

(73) Assignee: Nokia Corporation, Espoo (FI)

(*) Notice: Subject to any disclaimer, the term of this patent is extended or adjusted under 35 U.S.C. 154(b) by 2420 days.

(21) Appl. No.: 10/880,982

(22) Filed: Jul. 1, 2004

(65) Prior Publication Data

US 2005/0267936 A1 Dec. 1, 2005

(30) Foreign Application Priority Data

Apr. 30, 2004 (FI) ..................................... 20045162

(51) Int. Cl.
H04W 4/06 (2009.01)
H04L 29/06 (2006.01)
H04L 12/18 (2006.01)
G06Q 30/00 (2012.01)
H04Q 9/00 (2006.01)
H04W 4/08 (2009.01)
H04W 8/18 (2009.01)
H04W 72/00 (2009.01)

(52) U.S. Cl.
CPC ............. H04W 4/06 (2013.01); H04L 12/18 (2013.01); G06Q 30/00 (2013.01); H04Q 9/00 (2013.01); H04W 4/08 (2013.01); H04W 8/18 (2013.01); H04W 8/186 (2013.01); H04W 72/005 (2013.01); H04L 65/4061 (2013.01); H04L 65/1016 (2013.01)

(58) Field of Classification Search
CPC ........... G06Q 30/00; H04L 12/18; H04Q 7/20
USPC .................. 709/206, 205, 207, 227, 228, 229
See application file for complete search history.

(56) References Cited

U.S. PATENT DOCUMENTS

| 5,752,186 | A | * | 5/1998 | Malackowski et al. | 455/414.1 |
| 6,047,310 | A | * | 4/2000 | Kamakura et al. | 709/201 |
| 6,286,005 | B1 | * | 9/2001 | Cannon | 705/14.66 |
| 6,327,572 | B1 | * | 12/2001 | Morton et al. | 705/7.29 |
| 6,941,375 | B1 | * | 9/2005 | Govindarajan et al. | 709/229 |
| 7,151,942 | B1 | * | 12/2006 | Evens et al. | 455/458 |

(Continued)

FOREIGN PATENT DOCUMENTS

WO WO 00/69185 11/2000
WO WO 2005/025131 A1 3/2005

OTHER PUBLICATIONS

Rosenberg, "Extensible Markup Language (XML) Configuration Access Protocol (XCAP) Usages for Setting Presence Authroization draft-ietf-simple-xcap-auth-usage-01", Oct. 2003.*

(Continued)

Primary Examiner — O. C. Vostal
(74) Attorney, Agent, or Firm — Ditthavong & Steiner, P.C.

(57) ABSTRACT

A resource list or a user profile is provided with a new parameter, called a group advertisement parameter, which indicates whether a user allows a group advertisement for an individual communication group or not. The user can set the group advertisement parameter in a resource list when he/she creates the communication group. When the user has created a communication group, a group communication server processes the group further as any other group. If the group communication server observes that a group advertisement parameter is present or set active, the server starts advertising the communication group to all group members or to a selected subset of group members.

29 Claims, 1 Drawing Sheet

(56) References Cited

U.S. PATENT DOCUMENTS

| | | | | |
|---|---|---|---|---|
| 7,331,057 | B2* | 2/2008 | Eldering et al. | 725/32 |
| 7,386,000 | B2* | 6/2008 | Löppönen et al. | 370/433 |
| 7,464,050 | B1* | 12/2008 | Deaton et al. | 705/14.1 |
| 7,761,516 | B2* | 7/2010 | Mason et al. | 709/206 |
| 8,135,796 | B1* | 3/2012 | Slaughter et al. | 709/217 |
| 2001/0032137 | A1* | 10/2001 | Bennett et al. | 705/14 |
| 2002/0112238 | A1* | 8/2002 | Kanojia et al. | 725/42 |
| 2002/0124182 | A1* | 9/2002 | Bacso et al. | 713/200 |
| 2002/0141560 | A1* | 10/2002 | Khayatan et al. | 379/219 |
| 2002/0150091 | A1 | 10/2002 | Lopponen et al. | |
| 2002/0151321 | A1* | 10/2002 | Winchell et al. | 455/519 |
| 2003/0037103 | A1* | 2/2003 | Salmi et al. | 709/203 |
| 2003/0083086 | A1* | 5/2003 | Toyryla et al. | 455/518 |
| 2003/0109249 | A1* | 6/2003 | Frantz | 455/414 |
| 2003/0153339 | A1 | 8/2003 | Crockett et al. | |
| 2003/0186716 | A1 | 10/2003 | Dorenbosch et al. | |
| 2003/0217007 | A1* | 11/2003 | Fukushima et al. | 705/51 |
| 2004/0059712 | A1* | 3/2004 | Dean et al. | 707/1 |
| 2004/0163101 | A1* | 8/2004 | Swix et al. | 725/9 |
| 2004/0215568 | A1* | 10/2004 | Fukushima et al. | 705/51 |
| 2005/0021773 | A1* | 1/2005 | Shiga et al. | 709/228 |
| 2005/0054361 | A1* | 3/2005 | Turcanu et al. | 455/518 |

OTHER PUBLICATIONS

Rosenberg, "Extensible Markup Language (XNML) Configuration Access Protocol (XCAP) Usages for Setting Presence Authorization draft-ieft-simple-xcap-auth-usage-01", Oct. 2003.*

Koskelainen et al., "an Extensible Markup Language (XML) Configuration Access Protocol (XCAP) Usage for Conference Policy Manipulation draft-koskelainen-xcon-xcap-cpcp-usage-01", Oct. 2003.*

Koskelainen et al., "An Extensible Markup Language (XML) Configuration Access Protocol (XCAP) Usage for Conference Policy Manipulation draft-koskelainen-xcon-xcap-cpcp-usage-00", Jun. 2003.*

Rosenberg et al., "Extensible Markup Language (XNML) Configuration Access Protocol (XCAP) Usages for Setting Presence Authorization draft-ieft-simple-xcap-auth-usage-01".*

Koskelainen et al., "An Extensible Markup Language (XML) Configuration Access Protocol (XCAP) Usage for Conference Policy Manipulation draft-koskelainen-xcon-xcap=cpcp-usage-01".*

Merriam-Webster, "group", 2014.*

Push to Talk Over Cellular (PoC)—Architecture, Draft Version 1.0—Mar. 25, 2004, Open Mobile Alliance.

An Extensible Markup Language (XML) Configuration Access Protocol (XCAP) Usage for Conference Policy Manipulation; Xcon, P. Koskelainen et al., Feb. 4, 2004.

An Extensible Markup Language (XML) Format for Representing Resource Lists, Simple, J. Rosenberg, Feb. 14, 2004.

An Extensible Markup Language (XML) Configuration Access Protocol (XCAP) Usage for Conference Policy Manipulation, XCON, P. Koskelainen, et al., Feb. 4, 2004.

Tapio Paavonen, "Group Advertisement, Stage 3", OMA-PoC-2004-0374-CP-6.1.x Group Advertisement, POC WG, Jun. 8, 2004, retrieved from www.openmobilealliance.com/POC/2004, pp. 1-4.

Tapio Paavonen, "Group Advertisement, Stage 3", OMA-PoC-2004-0377-CP-7.2.2.x Group Advertisement, POC WG, Jun. 8, 2004, retrieved from www.openmobilealliance.com/POC/2004, pp. 1-3.

Rosenberg, J.: Extensible Markup Language (XML) Configuration Access Protocol (XCAP) Usages for Setting Presence Authorization. Oct. 27, 2003, pp. 1-22, http://tools.ietf.org/html/draft-ietf-simple-xcap-auth-usage-01.

Supplementary European Search Report, PCT/FI2005050137, Sep. 15, 2009, pp. 1-3.

* cited by examiner

GROUP COMMUNICATION IN A COMMUNICATION SYSTEM

FIELD OF THE INVENTION

The present invention relates to group communication in a communication system.

BACKGROUND OF THE INVENTION

One special feature offered in mobile communications systems is group communication. The term "group", as used herein, refers to any logical group of three or more users participating in the same group communication, e.g. a speech call. The same user may be a member of more than one communication group. Often the members of the communication group belong to the same organization. Also, typically, the same organization has several separate groups, i.e. a set of groups.

Push-to-talk over Cellular (PoC) is an overlay speech and data service in a mainly for mobile cellular network where a connection between two or more parties is established (typically) for a long period but the actual radio channels at the air interface are activated only when somebody is talking. This corresponds to the usage in traditional radiotelephones where the used radio frequency is agreed between the parties (e.g. military/police radios, LA radios, walkie-talkie-type radios). A PoC communication is not limited to mobile cellular network as users may use broadband, fixed or WLAN connections for communications. A push-to-talk switch, a voice activity detector (VAD) or any suitable means are used for indicating the user's desire to speak, and user equipment sends a service request to the network. The network either rejects the request or allocates the requested resources on the basis of predetermined criteria. At the same time, a connection is also established to a receiving user, or users in the case of group communication. After the voice connection has been established, the requesting user can talk and the other users can listen. When the user releases the push-to-talk switch or, in the case of traffic inactivity, the event is detected in the network, and the resources may be released and/or the talk item may be granted to another user. Thus, the resources are reserved only for the actual speech transaction or speech item, instead of reserving the resources for a "call" or session.

In some approaches, the group communication service, and also a one-to-one communication, is provided in form of a user or application level service so that the underlying communications system only provides the basic packet-mode connections (i.e. IP connections) between the group communications applications in the user terminals and the group communication service. The group communication service can be provided by a group communication server system in the infrastructure while the group client applications reside in the user equipments or terminals. For instance, the Voice over Internet Protocol (VoIP) enables a speech communication over an IP connection. The Session Initiation Protocol (SIP) is conventionally used for call establishment in "VoIP" based communication systems.

The group communication server system manages groups and lists (e.g. contact and access lists) that are needed for the group communication service. These lists are often referred to as resource lists. Functions provided by the server system may include providing list management operations to create, modify, retrieve and delete groups and lists, and providing storage for groups and lists. Users may have access to different lists in the server system, e.g., contact lists, group lists, etc. Most list management functions, such as adding or removing contacts or groups, take place as a direct result of a user action. Push-to-talk over Cellular (PoC) specifications defined by Open Mobile Alliance (OMA) can be found at http://www.openmobilealliance.org. A PoC participant who has authority to initiate and administrate an active group session, is called a PoC host or a group communication host herein.

The group communication (e.g. PoC, Push to Talk) referred to above, may be considered as a subset of the conferencing concept defined by Internet Engineering Task Force (IETF). IETF specifications and Internet Drafts can be found at http://www.ietf.org. Mechanism for policy manipulation of a multi-party conference is described in the document: An Extensible Markup Language (XML) Configuration Access Protocol (XCAP) Usage for Resource Lists, http://www.ietf.org/internet-drafts/draft-ietf-simple-xcap-list-usage-02.txt, October 2003, Work in Progress. Also in Push-to-Talk over Cellular concept, resource lists for group communication are preferably defined in the form of Extensible Markup Language (XML) structures, and thus XCAP can be used for storing and manipulating, e.g. creating, modifying and deleting, XML data on a server. The XCAP is a HTTP 1.1 based protocol that allows clients to read, write, modify and delete application data stored in XML format at a server. XCAP maps XML document elements and attributes to HTTP URIs that can be directly accessed by HTTP.

The participation in PoC sessions is only permitted once the user has applied for and been granted a subscription to access PoC services. The user can then participate in PoC sessions, either with another PoC user or with a PoC group. As a PoC participant, the user can be a member of more than one group at a time. The user is able to receive notifications of PoC groups available to participate in and hence to request to join those groups, or he may receive invitations to participate in other PoC groups. He is able to identify which group he is participating in and retrieve a list of PoC group members participating in each group. Changes in group status are propagated to the PoC participants, for instance, when a new user joins a group or when an existing user leaves a group.

Then number of groups in the system will be high, and the new groups will be created and old ones deleted all the time. There is a need for a mechanism for a group host to advertise a created or modified group.

BRIEF DESCRIPTION OF THE INVENTION

An object of the present invention is to provide methods and means for advertising a communication group.

The object of the invention is achieved by methods, user equipments and group communication server systems which are characterized by what is stated in the independent claims. The preferred embodiments of the invention are disclosed in the dependent claims.

According to the present invention, a resource list or a user profile is provided with a new parameter, referred to as a group advertisement parameter herein, which indicates whether a user allows a group advertisement for an individual communication group or not. The user can set the group advertisement parameter in a resource list when he/she creates the communication group. When the user has created a communication group, a group communication server processes the group further as any other group. If the group communication server observes that a group advertisement parameter is present or set active, the server starts advertising the communication group to all group members or to a selected subset of group members.

The present invention provides an easy-to-use and easy-to-implement solution for managing group advertisement.

BRIEF DESCRIPTION OF THE DRAWINGS

In the following the invention will be described in greater detail by means of preferred embodiments with reference to the attached drawings, in which.

DETAILED DESCRIPTION OF THE INVENTION

Figure 1:
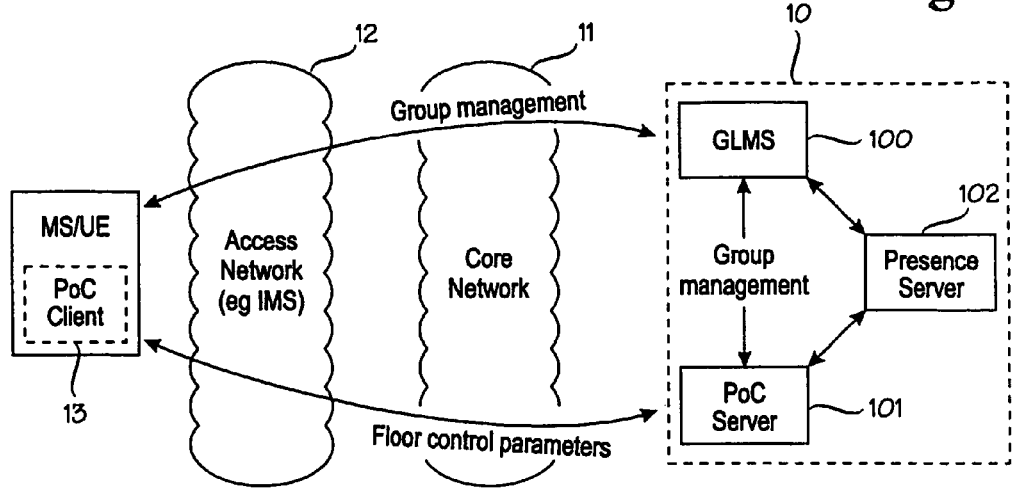
FIG. 1 illustrates an example of a communication system wherein the present invention can be applied.

As an example of a system environment to which the principles of the present invention may be applied will be described with reference to FIG. 1. In FIG. 1, a Push-to-talk Over Cellular (PoC) server system 10 is provided on top of the IP Multimedia Subsystem (IMS) based core network 11 or corresponding SIP/IP core, in order to provide a packet mode (e.g. IP) voice, data and/or multimedia communication services to User Equipments (UEs) or Mobile Stations (MSs). The core 11 may be configured, for example, to route the SIP signaling between a PoC client and the PoC server system 10 and perform authentication and authorization of a PoC client on the basis of the user's service profile.

The access network 12 used by the PoC architecture includes nodes required to gain IP connectivity and possible IP mobility. An example of an IP access network is Universal Mobile Telecommunications System (UMTS) comprising of the radio access network and general packet radio service. As the core network 11 and the access network are not relevant to the present invention, this will not be described in more detail here. For more detailed description, the overall IMS architecture is specified in the technical specifications 3GPP TS 23.221, 3GPP TS 23.228, 3GPP TS 24.228, and 3GPP TS 24.229 V6.0.0, for example.

In the illustrating PoC architecture of FIG. 1, a PoC client 13 resides on the mobile terminal UE and is used to access PoC service 10. The PoC client 13 may be configured to perform some or each of the following functions: provide the capabilities for PoC session initiation, participation and termination; perform registration with the SIP/IP core 11; participate in authentication with the SIP/IP core 11; provide access to different lists in a Group and List Management Server (GLMS), e.g., contact lists, group lists etc; support floor control procedures (e.g., make request and respond to commands); provide access to presence information, etc.

A PoC server 101 implements necessary network functionality for the PoC service. The PoC server 101 may be configured to perform some or all of the following functions: provide PoC session handling; provide the media distribution (i.e. voice, data, etc.); provide the floor control functionality including talker identification; provide SIP session handling, such as SIP session origination, termination, etc.; provide policy enforcement for participation in group sessions; provide policy handling for incoming PoC session (e.g. access control, availability status, etc); etc.

A Presence Server 102 is an optional server that may be present for providing availability information for the PoC service.

The Group and List Management Server (GLMS) 100 enables PoC users to manage groups and resource lists (e.g. contact and access lists) that are needed for the PoC service. The GLMS 100 may be configured to perform the following functions: provide list management operations to create, modify, retrieve and delete groups and lists; and provide storage for groups and lists.

Lists maintained in the GLMS 100 may include contact lists, access lists, user accept lists, and/or user reject lists.

A contact list ("Buddy List") of an end user contains addresses of other users or groups.

An access control list can be used by the end user as a means of controlling the incoming PoC session requests from other users or groups. Each user may have a user accept list and a user reject list. On the accept list and the reject list the user can maintain users and/or groups from whom the user is or, respectively, is not willing to receive PoC session requests.

A resource list may be an XML document. XML namespaces can be used for identifying resource list documents and document fragments. The XML namespace can be identified with a unique URI (uniform resource identifier), such as a URN (a uniform resource name). Example of a URN is: urn:ietf:params:xml:ns:resource-lists.

A resource list document may begin with the root element tag "resource-lists". It consists of an optional "mandatory-ns" element (followed by any number of "list" sub-elements, each of which is a resource list. Other elements from different namespaces may be present for the purposes of extensibility. There are three attributes associated with the "list" element. The first is "name". This attribute is a descriptive name for the list. It is unique amongst all other list elements within the same parent element. It serves as a useful, but optional way to identify a list. Each list element may also have attributes (e.g. Boolean attributes) which indicate a specific action that may be made against that list. When an attribute is absent, it implies that the operation is not supported.

In preferred embodiments, a standardized naming convention for mapping components of XML documents to HTTP URIs is used, the basic operations for accessing the data can be provided by existing HTTP primitives. Reading one of the components can be accomplished with HTTP GET, creating or modifying one of the components can be done with an HTTP PUT, and removing one of the components can be done with an HTTP DELETE.

The standardized conference policy elements, such as access control lists, and the standardized protocol means (such as the XCAP) to manipulate them is also called a conference policy control protocol. This approach is described in the document: An Extensible Markup Language (XML) Configuration Access Protocol (XCAP) Usage for Conference Policy Manipulation, http://www.ietf.org/internet-drafts/draft-koskelainen-xcon-xcap-cpcp-usage-02.txt, February 2004, Work in Progress. In such a case the XML documents including the resource list and attributes may be called conference policy documents. A URN according to IETF could then be: urn:ietf:params:xml:ns:conference-policy.

The conference-policy may be built up using multiple namespaces, such as:

"urn:ietf:params:xml:ns:conference-settings": This namespace defines elements for conference setting. The inclusion of this namespace is optional. It contains the mandatory element <Conference-settings>. This element contains the conference URI(s) and maximum number of participants.

"urn:ietf:params:xml:ns:conference-info": This namespace defines elements to carry conference information. The inclusion of this namespace is optional. It contains the mandatory element <Conference-info>. This element includes information describing the conference.

It should be appreciated that these are only examples of XML documents containing resource lists or similar definitions. The principles according to the present invention can be applied in other data structures of resource list without departing from the scope of the present invention.

In an embodiment of the present invention, a resource list is provided with a new parameter, called a group advertisement parameter herein, which indicates whether a user allows a group advertisement for an individual communication group or not. The user can set the group advertisement parameter in a resource list when he/she creates the communication group. In an embodiment of the invention, absence of a group advertisement parameter in a resource list indicates that a group advertisement is not set. In another embodiment of the invention, a group advertisement parameter is always present and can have different statuses (e.g. active/inactive or active/inactive/selected users). When the user has created a communication group, a group communication server (e.g. the PoC server 101) processes the group further as any other group. If the group communication server observes that a group advertisement parameter is present or the group advertisement parameter is set active, the server starts advertising the communication group to all group members or to a selected subset of group members. An unrestricted group may be advertised to any subscriber. The advertisement may include any group information e.g., group identity, PoC host of the group (i.e. the user who created the group), etc. The advertisement may be performed using any suitable signaling message, such as SIP MESSAGE.

There are various ways to include the new advertisement parameter in a resource list. For example, in the "urn:ietf:params:xml:ns:conference-settings" namespace that defines elements for conference setting, the <Conference-settings> element may include a new attribute <advertisement> as a group advertisement parameter. As another example, in the "urn:ietf:params:xml:ns:conference-info" namespace that defines elements to carry conference information, the <Conference-info> element may include a new attribute <advertisement> as a group advertisement parameter.

In an embodiment of the invention, a user profile contains a group advertisement parameter that can be set e.g. by an operator on the basis of a subscription from a user. The user profile is maintained in a subscriber database of the home core network 11, and relevant user profile information is copied to a group communication server when a user registers with a group communication service. When a user creates a group using the normal procedures, a group communication server (e.g. the PoC server 101) checks the status of the group advertisement parameter (e.g. active/inactive). If the group advertisement parameter is active then the server starts advertising the group. The disadvantages of this approach are that group creation and advertisement parameter setting require different operations, and that differentiation between groups is difficult or not feasible at all.

Figure 2:
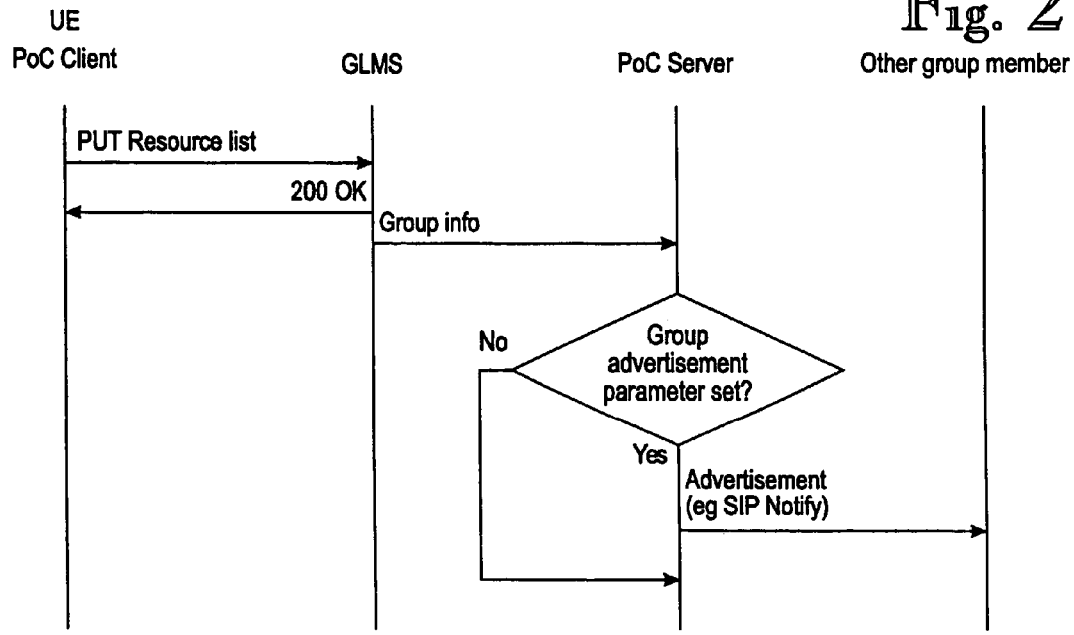
FIG. 2 is a signalling diagram showing an example of a signaling flow according to the present invention.

A practical example will now be described with reference to FIG. 2. A first user, Zack, uses XCAP based solution to create a group named pilotgroup@example.com. The group includes group members Alice@example.com, Bob@example.com and Cecile@example.com. When Zack uses XCAP for creating a group he inserts the group advertisement parameter. In FIG. 2, this procedure is presented by HTTP PUT Resource list message sent from UE/Poc Client to the GLMS 100. The GLMS 100 accepts the group creation, and the group information is transferred to the PoC server 101 when the group advertisement parameter is present or set. The PoC server 101 observes the presence of the group advertisement parameter, and sends an advertisement to Alice, Bob and Cecile. Alice, Bob and Cecile receive the advertisement that they have been included in the group. Now, they could join in the group if they please to do so. It is possible that the GLMS sends group information to the PoC Server although the group advertisement parameter is not present or it is not set then the process in the PoC server continues without group advertisement. The GLMS may not contact the PoC Server at all if the group advertisement parameter is not present/set.

It will be obvious to a person skilled in the art that the inventive concept can be implemented in various ways. For instance, a UE/PoC client may communicate directly with a PoC server using XCAP based solution for creating or modifying a group and this operation may trigger a group advertisement based on a group advertisement parameter. As a further example, the GLMS may itself send the group advertisement.

More generally, it should be appreciated that the functionality according to the invention can be freely situated in or distributed between the various entities within the server system 10 or corresponding equipment, without departing from the present invention. The invention and its embodiments are not limited to the examples described above but may vary within the scope and spirit of the claims.

The invention claimed is:

1. A method, comprising:
   receiving, by a processor, a communication group definition that is used for creation of a new communication group in a group communication service, wherein the communication group definition is provided with a group advertisement parameter indicating whether the new communication group is to be advertised to at least one member of the newly-created communication group;
   determining whether the group advertisement parameter indicates that the new communication group is to be advertised to the at least one member of the new communication group; and
   determining to send an advertisement of the new communication group from the group communication service to the at least one member of the new communication group based on the determination, wherein the advertisement informs the at least one member that the at least one member has been included in the new communication group.

2. The method according to claim 1, wherein the group advertisement parameter is included in a resource list.

3. The method according to claim 1, wherein said communication group definition comprises an extensible markup language data structure, and wherein a resource list comprising the group advertisement parameter is created using an extensible markup language configuration access protocol.

4. The method according to claim 3, wherein the extensible markup language data structure comprises a urn:ietf:params:xml:ns:conference-settings namespace comprising a conference-settings element, and wherein the group advertisement parameter comprises an attribute to the conference-settings element.

5. The method according to claim 3, wherein the extensible markup language data structure comprises a urn:ietf:params:xml:ns:conference-info namespace containing-comprising a conference-info element, and wherein the group advertisement parameter comprises an attribute to the conference-info element.

6. A method, comprising:
   receiving, by a processor, a communication group definition that is used for creation of a new communication group in a group communication service;

checking a status of a group advertisement parameter in a user profile by the group communication service, wherein said group advertisement parameter indicates whether the new communication group is to be advertised or not, and determining to send an advertisement of the new communication group from the group communication service to at least one member of the new communication group in response to an active status of the group advertisement parameter, wherein the advertisement informs the at least one member that the at least one member has been included in the new communication group.

7. An apparatus, comprising:

at least one processor; and at least one memory including computer program code, the at least one memory and the computer program code configured to, with the at least one processor, cause the apparatus to perform at least the following, determining to create a communication group definition that is used for creation of a new communication group in a remote group communication server system, wherein the communication group definition is provided with a group advertisement parameter indicating to the remote group communication server system whether the new communication group is to be advertised to at least one member of the created communication group, and determine whether the group advertisement parameter indicates that the new communication group is to be advertised to at least one member of the new communication group, wherein the advertisement informs the at least one member of the new communication group that they have been included in the new communication group.

8. The apparatus according to claim 7, wherein the apparatus is further caused, at least in part, to create a resource list comprising the group advertisement parameter.

9. The apparatus according to claim 7, wherein said communication group definition comprises an extensible markup language data structure, and the apparatus is further caused, at least in part, to create a resource list comprising the group advertisement parameter using an extensible markup language configuration access protocol.

10. The apparatus according to claim 9, wherein the extensible markup language data structure comprises a urn:ietf: params:xml:ns:conference-settings namespace comprising a conference-settings element, and wherein the group advertisement parameter comprises an attribute to the conference-settings element.

11. The apparatus according to claim 9, wherein the extensible markup language data structure comprises a urn:ietf: params:xml:ns:conference-info namespace containing a conference-info element, and wherein the group advertisement parameter comprises an attribute to the conference-info element.

12. The apparatus according to claim 7, wherein the apparatus further comprises a push-to-talk over cellular client.

13. A system, comprising:

a management server configured to enable creation of a communication group definition that is used for creation of a new communication group, said communication group definition comprising a group advertisement parameter indicating whether the new communication group is to be advertised to at least one member of the new communication group, and a client server configured to send an advertisement of the new communication group to the at least one member of the created communication group in response to the group advertisement parameter, wherein the advertisement informs the at least one member that the at least one member has been included in the new communication group.

14. The system according to claim 13, wherein the management server comprises a group and list management server in a push-to-talk over cellular system, and wherein the client server is a push-to-talk over cellular server.

15. The system according to claim 13, wherein the management server comprises a group and the client server are located in a group and list management server in a push-to-talk over cellular system.

16. The system according to claim 13, wherein the management server and the client server are located in a push-to talk over cellular server.

17. The system according to claim 13, wherein the communication group definition comprises a resource list comprising the group advertisement parameter.

18. The system according to claim 13, wherein said communication group definition comprises an extensible markup language data structure, and wherein the management server is further configured to enable the user to create a resource list comprising the group advertisement parameter using an extensible markup language configuration access protocol.

19. The system according to claim 18, wherein the extensible markup language data structure comprises a urn:ietf: params:xml:ns:conference-settings namespace containing a conference-settings element, and wherein the group advertisement parameter comprises an attribute to the conference-settings element.

20. The system according to claim 19, wherein the extensible markup language data structure comprises a urn:ietf: params:xml:ns:conference-info namespace containing a conference-info element, and wherein the group advertisement parameter comprises an attribute to the conference-info element.

21. A system, comprising:

a management server executed on a computing apparatus and configured to enable a user to create a communication group definition that is used for creation of a new communication group; and, a client server executed on a computing apparatus and configured to check a status of a group advertisement parameter in a user profile, said group advertisement parameter indicating whether the new communication group is to be advertised to, and further configured to send an advertisement of the new communication group to at least one member of the created communication group in response to an active status of the group advertisement parameter, wherein the advertisement informs the at least one member that the at least one member has been included in the new communication group.

22. The system according to claim 21, wherein the management server comprises a group and list management server in a push-to-talk over cellular system, and wherein the client server is a push-to-talk over cellular server.

23. The system according to claim 21, wherein the management server and the client server are located on a group and list management server in a push-to-talk over cellular system.

24. The system according to claim 21, wherein the management server and the client server push-to-talk over cellular server are located on a push-to-talk over cellular server.

25. A method, comprising:

determining, by a processor, to create and to store a communication group definition in a remote group communication server system, the communication group definition being used for creation of a new communication group; and determining to store the communication group definition with a group advertisement parameter indicating to the remote group communication server system whether the new communication group is to be advertised to at least one member of the communication group, wherein the advertisement informs the at least one member that the at least one member has been included in the new communication group.

26. The method according to claim 25, wherein the creating further comprises creating a resource list comprising the group advertisement parameter.

27. The method according to claim 25, wherein the communication group definition comprises an extensible markup language data structure, and the method further comprises creating a resource list comprising the group advertisement parameter using an extensible markup language configuration access protocol.

28. The method according to claim 27, wherein the extensible markup language data structure comprises a urn:ietf:params:xml:ns:conference-settings namespace comprising a conference-settings element, and wherein the group advertisement parameter comprises an attribute to the conference-settings element.

29. The method according to claim 27, wherein the extensible markup language data structure comprises a urn:ietf:params:xml:ns:conference-info namespace containing a conference-info element, and wherein the group advertisement parameter comprises an attribute to the conference-info element.

* * * * *